United States Patent [19]
Ishigaki

[11] 3,818,355

[45] June 18, 1974

[54] SYSTEM FOR DEMODULATING AN ANGULAR MODULATED WAVE IN WHICH A CARRIER WAVE OF LOW FREQUENCY IS MODULATED

[75] Inventor: Yukinobu Ishigaki, Yamato Japan

[73] Assignee: Victor Company of Japan Ltd., Yokohama, Japan

[22] Filed: Sept. 6, 1972

[21] Appl. No.: 286,808

[30] Foreign Application Priority Data

Sept. 18, 1971 Japan .............................. 46-72633

[52] U.S. Cl................. 329/104, 178/88, 179/1 GQ, 179/15 BT, 179/100.1 TD, 325/320, 329/112, 329/126

[51] Int. Cl.......................... H03d 3/04, H04l 27/22

[58] Field of Search.................... 329/104, 112, 126; 325/320, 321, 324, 325; 178/66, 88; 179/15 BT, 1 GQ, 100.1 TD

[56] References Cited

UNITED STATES PATENTS

| | | | |
|---|---|---|---|
| 3,430,143 | 2/1969 | Walker et al. | 325/320 X |
| 3,594,651 | 7/1971 | Wolejsza | 329/104 |
| 3,675,139 | 7/1972 | Guest | 178/66 R |
| 3,686,471 | 8/1972 | Takahashi | 179/100.1 TD |

*Primary Examiner*—Alfred L. Brody

[57] ABSTRACT

A demodulating system produces two square waves of mutually opposite phase responsive to an angular modulated wave in which a carrier wave of low frequency is modulated. The phase of one square wave is delayed by 90°, thereby to produce two square waves of mutually opposite phase. The four square waves of phases respectively differing by 90° are differentiated for producing a differentiated pulse train of a frequency which is quadruple the frequency of the angular modulated wave. Pulse counting means demodulates this differentiated pulse train.

8 Claims, 16 Drawing Figures

SYSTEM FOR DEMODULATING AN ANGULAR MODULATED WAVE IN WHICH A CARRIER WAVE OF LOW FREQUENCY IS MODULATED

BACKGROUND OF THE INVENTION

This invention relates to a system for demodulating an angular modulated wave and more particularly to a system using a pulse-count method for demodulating an angularly modulated wave in which a carrier wave of a relatively low frequency is modulated.

The applicant has previously proposed a system for recording four-channel signals on and reproducing from a record disc, as disclosed in U.S. Pat. application Ser. No. 92,803, filed Nov. 25, 1970, now U.S. Pat. No. 3,686,471, issued Aug. 22, 1972, entitled "SYSTEM FOR RECORDING AND/OR REPRODUCING FOUR CHANNEL SIGNALS ON A RECORD DISC." Generally, components such as the pickup cartridge and the record disc have limits to their reproduction performance in high-band regions. For this reason, in this previously proposed four channel record disc, the band of the angular modulated signal of the difference signal of two channel signals is recorded in superimposition with a direct-wave signal of the sum signal of the two channel signals. This application taught that the band should be selected at a value as low as possible without causing conflict with the direct-wave signal band. Accordingly, a carrier wave to be employed in angular modulation is selected to have a relatively low frequency, for example, of 30 KHz.

In an angular modulated wave wherein a carrier wave of such low frequency is modulated, however, the lower side band thereof approaches very closely the high frequency band of the demodulated audio band. Accordingly, as will be described hereinafter, together with a conventional system, the lower side band of a frequency-modulated wave appears in the high frequency band of the modulated audio signal band, in this system following the demodulation circuit. In this case, this lower side band and the high frequency band of the audio signal band undergo mutual interference to generate subharmonics and remarkably increase distortions.

SUMMARY OF THE INVENTION

Accordingly, it is a general object of this invention to provide a novel and useful demodulation system capable of demodulating an angularly modulated wave in which a carrier wave of low frequency is modulated with the demodulation being carried out in an excellent manner without the occurrence of interference and distortion.

Another object of this invention is to provide a system capable of accomplishing pulse-count demodulation of an angularly modulated wave in which a carrier wave of low frequency is modulated. Demodulation is accomplished without interference of the lower side band with the high frequency band of the demodulated signal.

Still another object of this invention is to provide a system capable of effectively demodulating an angularly modulated wave in which a carrier wave of low frequency is modulated. This demodulation is provided by means of a simple circuit organization for accomplishing, essentially, frequency multiplication of the angularly modulated wave without the use of a conventional frequency multiplication circuit.

Other objects and features of this invention will be apparent from the following detailed description when read in conjunction with the accompanying drawings.

DETAILED DESCRIPTION

Figure 1:
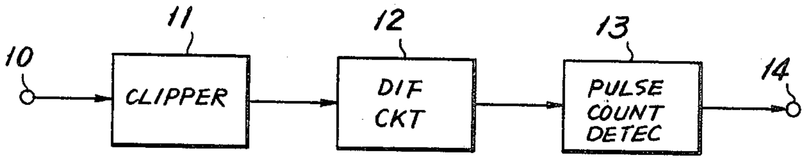
FIG. 1 PRIOR ART
FIG. 1 is a block diagram showing one example of a known pulse-count demodulation system.

As conducive to a full understanding of the present invention, the following general considerations and a brief description of known systems are first presented.

In general, with respect to an angularly modulated wave such as, for example, a frequency modulated wave, the voltage $E_{FM}$ of the frequency-modulated signal can be represented by the following equation.

$E_{FM} = A\cos(2\pi fct + (\Delta f/fm)\sin 2\pi fmt + \phi)$ Furthermore, the modulation index $mf$ can be represented by the following equation.

$mf = \Delta f/fm$

In these equations:

$A$ is the amplitude of the carrier wave; $fc$ is the frequency of the carrier wave; $\Delta f$ is the frequency deviation; $fm$ is the modulation frequency; and $\phi$ is the initial phase angle.

In addition, the signal voltage $E'_{FM}$ of the side band in the case where frequency modulation is carried out can be represented by the following equation.

$$E'_{FM} = A \sum_{n=-\infty}^{\infty} Jn\ (mf)\ \cos\ (2\pi fc + n \cdot 2\pi fm)t$$

(The initial phase angle is omitted.)

Here, $Jn$ is a Bessel function of the first class of the $n$ th order.

As is apparent from the above equations, an infinite number of side bands are produced in frequency regions higher and lower than the carrier wave frequency interposed therebetween. As is known, these side bands exist at positions corresponding to integral multiples of the modulation frequency $fm$. Moreover, the side band spectrum varies in accordance with the value of the modulation index $mf$.

In general, a pulse count demodulation system is advantageous for the demodulation of a frequency modulated wave in which a carrier wave of low frequency is modulated. One example of a known pulse count demodulation system is indicated by block diagram in FIG. 1. In this system, a frequency modulated wave signal introduced through an input terminal 10 is converted into a square wave by a clipper 11. The square wave is then differentiated by a differentiation circuit 12. The resulting differentiated pulse is pulse count detected by a detector circuit 13, and a demodulated output is fed out from an output terminal 14.

Figure 4A:
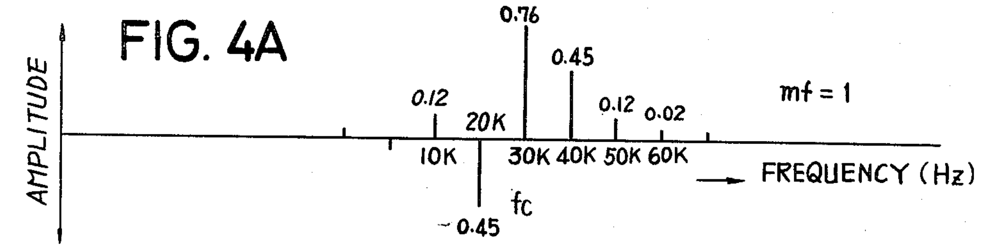
FIGS. 4A, 4B, and 4C are frequency spectrum charts, respectively showing side bands of modulated waves in cases where the modulation indexes are 1, 2, and 4.

Then, in the case where, for example, the carrier wave frequency *fc* is 30 KHz, the modulation frequency fm is 10 KHz. The frequency deviation $\Delta f$ is 10 KHz, the modulation index *mf* becomes unity (1), and the frequency spectrum of the side band in this case is found from the above set forth equation and is as indicated in FIG. 4A. The second side band of the lower side band exists with an amplitude of 0.12 at a frequency position of 10 KHz. Accordingly, in the above described known demodulation system, this second lower side band produces interference with an audio frequency signal of 10 KHz, after demodulation. Thus, there has been the disadvantage of a remarkable worsening of the distortion factor.

Figure 2:
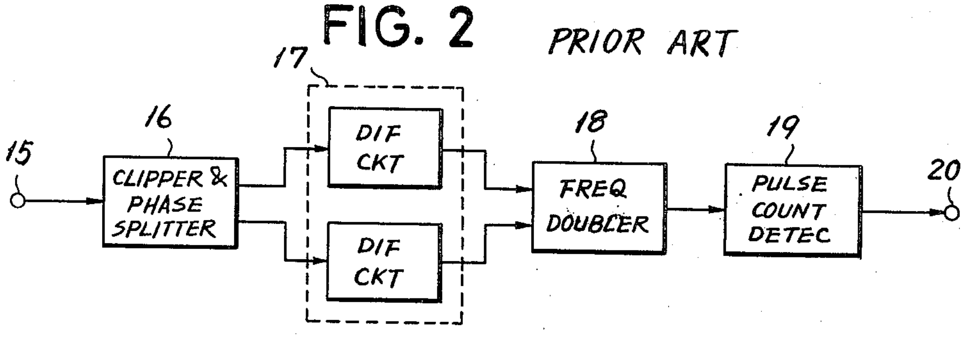
FIG. 2 PRIOR ART
FIG. 2 is a block diagram of a known pulse-count demodulation system, of frequency doubler type.

In the known pulse-count demodulating system of frequency doubler type indicated by block diagram in FIG. 2, a frequency modulated wave signal from a terminal 15 is waveshaped and phase split in a clipper and phase splitter circuit 16. The phase split signal is differentiated in a differentiation circuit 17. The resulting signal thus differentiated is doubled in a frequency doubler circuit 18. Further, the resulting signal is detected and demodulated in a pulse-count detection circuit 19, being led out through an output terminal 20 as a demodulated output. In this system, the doubling of the frequency by the doubler circuit 18 gives rise to a doubling also of the modulation index *mf.* The distribution of the side band also spreads with doubling as indicated in FIG. 4B.

Figure 4B:
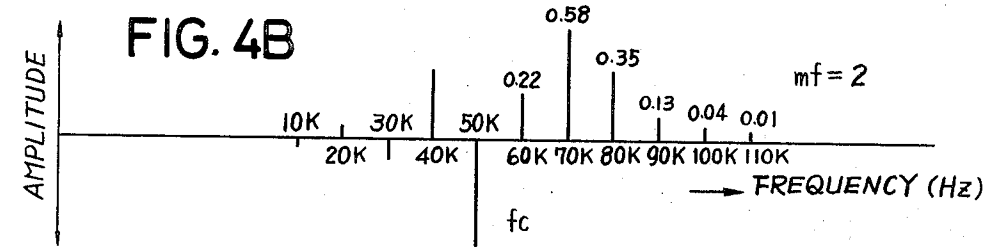

In this known system, a substantial improvement is realized, as is apparent from a comparison of FIGS. 4A and 4B, with respect to interference at an auduo frequency of 10 KHz, as compared to the interference in the known system described in conjunction with FIG. 1. Even with this improvement, however, interference is not completely eliminated, and, even in this system, a beat disturbance could not be fully avoided.

Figure 3:
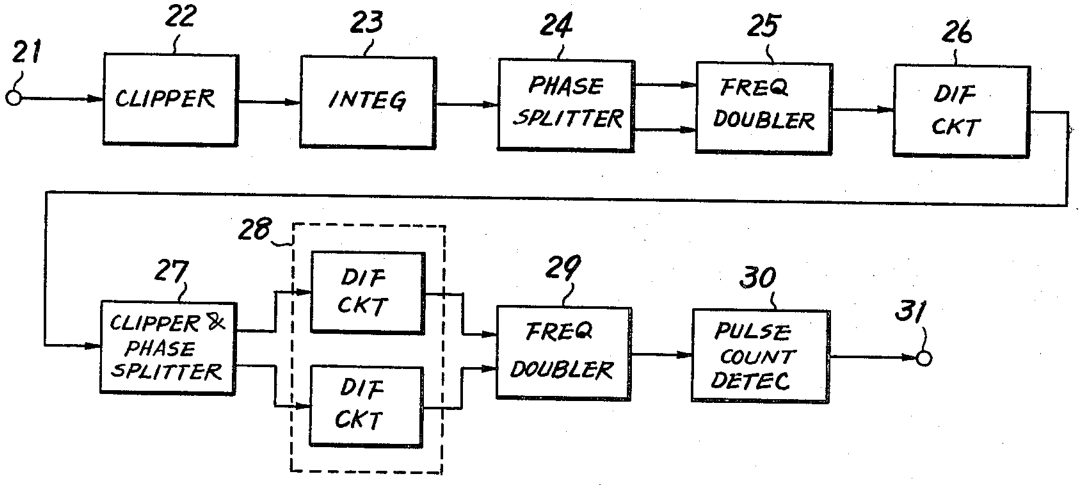
FIG. 3 is a block diagram of a pulse-count demodulation system of quadrupler type which the applicant has previously proposed.

Accordingly, the applicant has proposed a pulse-count demodulation system of quadrupler type as shown in FIG. 3. In this system, a modulated wave signal introduced through a terminal 21 passes through a clipper 22, an integration circuit 23, and a phase splitter circuit 24 and, after being doubled by a frequency doubler circuit 25, is differentiated by a differentiation circuit 26. The output signal of the differentiation circuit 26 thereafter passes through a clipper and phase splitter circuit 27 and a differentiation circuit 28 similarly, as shown in the system illustrated in FIG. 2. This signal is further doubled in a frequency doubler circuit 29, that is, quadrupled as a total effect. The signal thus quadrupled is thereafter demodulated by a pulse-count detection circuit 30, whereby a demodulated output signal is led out through the output terminal 31.

Figure 4C:
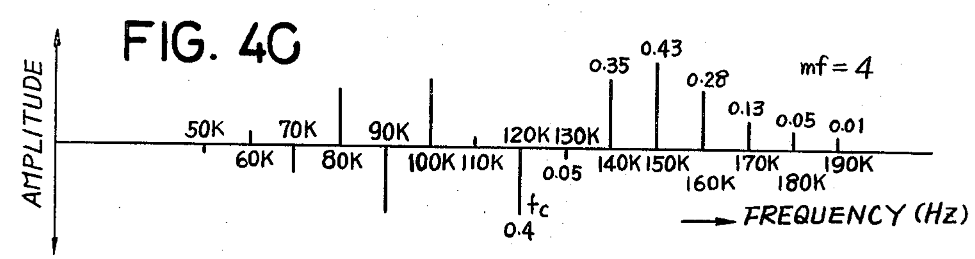

In this system, the distribution of the side band becomes that of the case where the demodulation index *mf* is 4, as indicated in FIG. 4C. As is apparent from FIG. 4C, there is almost no interference of a modulated audio frequency signal and no side band at the frequency position of 10 KHz. On the other hand, however, the use of a large number of frequency multiplication steps in this manner leads to complication of the circuitry. Furthermore, since a large number of circuit elements should be used, there arise problems such as the generation of more noise than in the systems shown in FIGS. 1 and 2.

The present invention overcomes the above described difficulties accompanying the known systems and solves the problems of the systems the applicant has previously devised.

Figure 5:
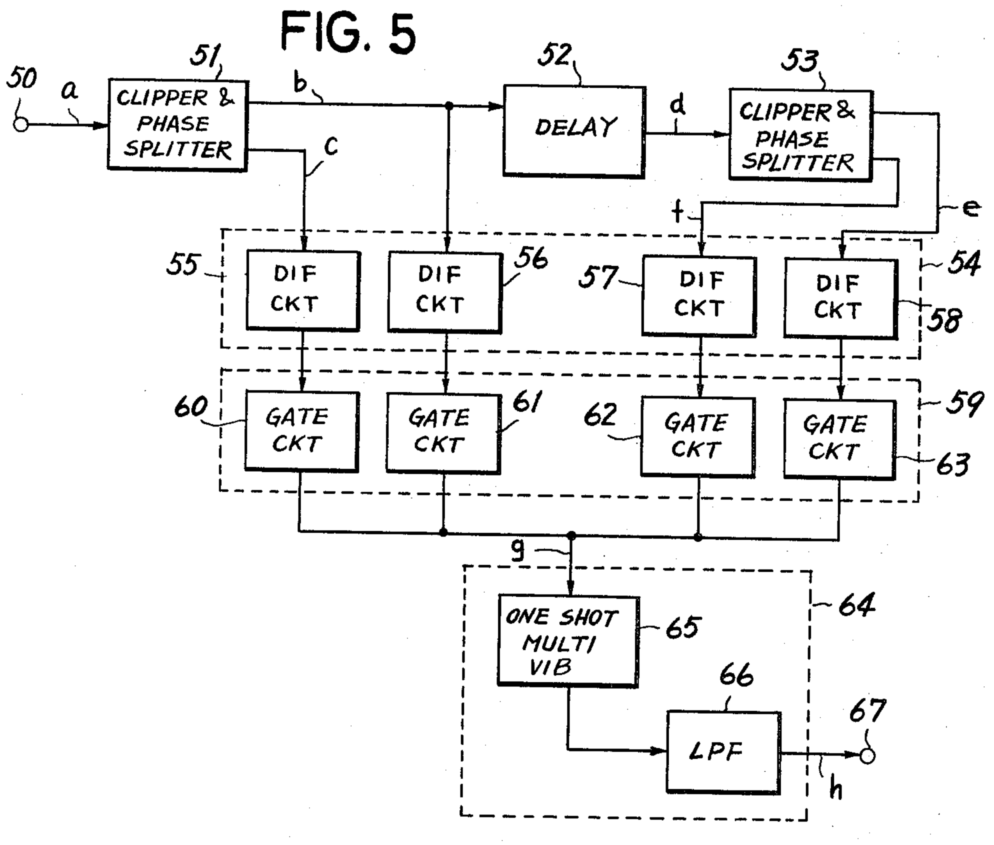
FIG. 5 is a block diagram showing the essential organization of one embodiment of a demodulating system constructed according to the teachings of the invention.

One embodiment of the system according to the present invention is illustrated by block diagram in FIG. 5, and by the signal waveforms at various parts of this block diagram, which are shown in FIGS. 6A through 6H.

Figures 6A, 6B, 6C, 6D, 6E, 6F, 6G, 6H:
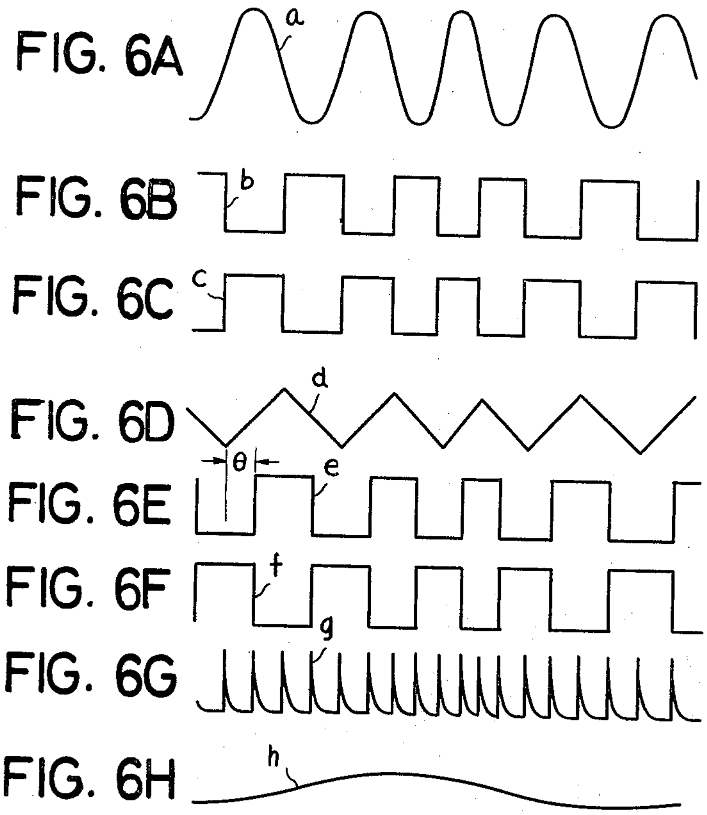
FIGS. 6A through 6H are diagrams showing the waveforms of signals appearing at various parts of the system shown in FIG. 5.

A frequency modulated wave *a* having waveform as indicated in FIG. 6A is introduced through an input terminal 50 and then supplied to a first clipper and phase splitter 51. In the instant embodiment of the invention, this angularly modulated wave *a* is a signal obtained by a pickup cartridge. The angularly modulated wave had been previously recorded on the aforementioned four-channel record disc, by angularly modulating (frequency modulating, phase modulating) a carrier wave of 30 KHz responsive to the difference signal of two channel signals and superimposing the same on the direct wave sum signal of two channel signals. On the output side of the circuit 51, a square wave *b* of opposite phase relative to the frequency modulated wave *a* and a positive-phase-sequence square wave *c* are obtained.

The output square wave *b* of opposite phase of the circuit 51 is supplied on one hand, to a second differentiation circuit 56 of a differentiation circuit group 54, while the output square wave *c* of positive-phase-sequence of the circuit 51 is supplied to a first differentiation circuit 55.

The output square wave *b* from opposite phase of the circuit 51, on the other hand, is supplied to a 90° delay circuit 52. In the instant embodiment, an integration circuit is used for this delay circuit 52. From this delay circuit 52, a triangular saw-tooth wave signal *d* (as indicated in FIG. 6D) results from the integration of the signal *b.* This signal *d* is supplied to a second clipper and phase splitter circuit 53, where it is clipped at the middle part of the rising slope of the triangular wave. From the output of this circuit 53, square wave signals *e* and *f* (as indicated respectively in FIGS. 6E and 6F) are obtained. These square wave signals *e* and *f* are signals of waveforms having phase lags of $\theta = 90°$ relative to square wave *c* and *b*, respectively. They are supplied respectively to a fourth differentiation circuit 58 and to a third differentiation circuit 57 of the differentiation circuit group 54.

The output signals *b* and *c* of the first clipper and phase splitter circuit 51 are differentiated by the first and second differentiation circuits 55 and 56. Then they pass respectively through first and second gate circuits 60 and 61 of a gate circuit group 59. Next they are supplied to a one-shot multivibrator 65 of a pulse-count detector circuit system 64, for counting the differentiated pulses and thereby demodulating them. On one hand, output signals *f* and *e* of the second clipper and phase splitter circuit have a 90° phase lag. These signals have been differentiated by the third and fourth differentiation circuits 57 and 58. Then they pass, respectively, through third and fourth gate circuits 62 and 63 of the gate circuit group 59. The signals are then supplied to the above mentioned one-shot multivibrator 65, together with the output signals of the above mentioned gate circuits 60 and 61.

The signals are mixed at the output sides of the gate circuits 60 through 63. That is, mixture occurs at the input side of the one-shot multivibrator 65. The mixed signals are the differentiated output, having no delay relative to the output square waves *b* and *c* of the first clipper and phase splitter circuit 51, and the differentiated output, having 90° lag relative to the output square waves *e* and *f* of the second clipper and phase splitter circuit 53. For this reason, a differentiated pulse train *g* is produced with a frequency which is quadruple the frequency of the square wave signals respectively. The differentiated signals have rising parts at the rising positions of the square wave signals *b, c, e,* and *f* as indicated in FIG. 6G. This signal is supplied to the one-shot multivibrator 65.

The differentiated pulses *g* thus supplied to the one-shot multivibrator 65 are there waveshaped. The output of the one-shot multivibrator 65 is supplied to a low-pass filter 66. The output of this low-pass filter 66 is let out as a demodulated audio signal *h*, as indicated in FIG. 6H, from an output terminal 67.

In the instant embodiment, the pulse-count detector circuit system 64 is made up essentially of the one-shot multivebrator 65 and the low-pass filter. An object of this embodiment is to produce a low distortion factor. However, instead of using the one-shot multivibrator 65, the differentiated pulse *g*, which is the output of the differentiation circuit group 59 may be passed directly to the low-pass filter. In this case also, a demodulated audio signal can be obtained somewhat as in the above described embodiment.

In the system of the instant embodiment, it is possible to obtain a differentiated pulse having a frequency which is quadruple that of a modulated carrier, without the use of any frequency multiplication circuit. In the pulse-count detection of this embodiment, there is no possibility of interference between the side band and the modulation frequency as in the system hitherto proposed and described hereinbefore with reference to FIGS. 3 and 4C. Accordingly, there is no accompanying worsening of the distortion factor due to beat disturbance. The demodulation of an angularly modulated wave, in which a carrier wave of low frequency is modulated, can be accomplished with an improved signal-to-noise ratio.

Figure 7:
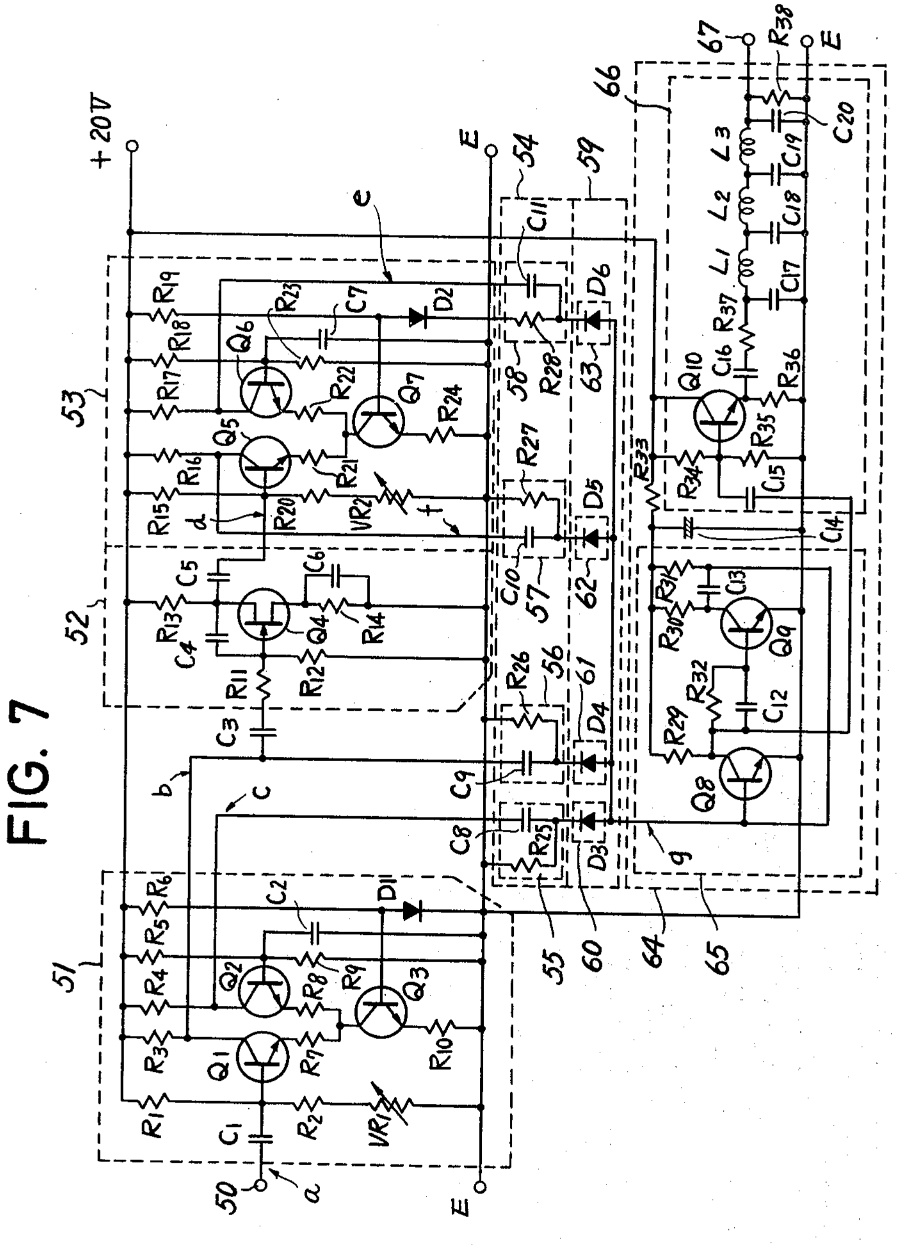
FIG. 7 is a schematic circuit diagram showing one embodiment of a specific electric circuit according to the system indicated in FIG. 5.

One specific embodiment, in concrete detail, of the organization of the demodulation system indicated by block diagram in FIG. 5 is illustrated by the circuit diagram of FIG. 7. The parts which correspond to parts in FIG. 5 are enclosed by dotted line and designated by like reference numerals.

The first clipper and phase splitter circuit 51 comprises transistors $Q_1$, $Q_2$, and $Q_3$, resistors $R_1$ through $R_{10}$, a variable resistor $VR_1$, capacitors $C_1$ and $C_2$, and a diode $D_1$. Output square wave signals *b* and *c*, which have been waveshaped and phase split by the circuit 51, are led out from the collectors of the transistors $Q_1$ and $Q_2$. On one hand, these signals *b* and *c* are respectively differentiated by the differentiation circuit 55 comprising a capacitor $C_8$ and a resistor $R_{25}$, and by the differentiation circuit 56 comprising a capacitor $C_9$ and a resistor $R_{26}$, respectively. These differentiated signals pass through gate circuits 60 and 61 comprising trigger diodes $D_3$ and $D_4$, and are supplied to a one-shot multivibrator 65.

On the other hand, the output square wave *b* of the circuit 51 is applied through a capacitor $C_3$ and a resistor $R_{11}$ to the gate of a field-effect transistor (FET) $Q_4$. The 90° delay circuit 52 comprises a Miller integration circuit including the FET $Q_4$, a capacitor $C_4$, and the resistor $R_{11}$. The triangular sawtooth wave *d*, integrated and formed by this Miller integration circuit, is applied through a capacitor $C_5$ to the base of a transistor $Q_5$ of the second clipper and phase splitter circuit 53, comprising transistors $Q_5$, $Q_6$, and $Q_7$, resistors $R_{15}$ through $R_{24}$, a variable resistor $VR_2$, a capactor $C_7$, and a diode $D_2$.

The output square wave *e* and *f* of this circuit 53 are led out from the collectors of the transistors $Q_5$ and $Q_6$, are differentiated by the differentiation circuits 58 and 57 comprising, respectively, a capacitor $C_{11}$ and a resistor $R_{28}$ and a capacitor $C_{10}$ and a resistor $R_{27}$. The differentiated signals pass through gate circuits 63 and 62 comprising, respectively, trigger diodes $D_6$ and $D_5$, and are supplied to the one-shot multivibrator 65.

The one-shot multivibrator 65 comprises transistors $Q_8$ and $Q_9$, resistors $R_{29}$ through $R_{32}$, and capacitors $C_{12}$ and $C_{13}$. The differentiated pulses from the above mentioned gate circuits 60, 61, 62, and 63 are applied to the base of the transistor $Q_8$. The resulting signal, which has been pulse-shaped by this one-shot multivibrator 65 is applied through a capacitor $C_{15}$ to the base of a transistor $Q_{10}$ of the low-pass filter 66.

The low-pass filter 66 includes a filter circuit comprising coils $L_1$, $L_2$, and $L_3$ and capacitors $C_{17}$ through $C_{20}$. The signal of the above described differentiated pulse trains is subjected to a pulse-count demodulation by the low-pass filter 66, and the carrier wave component is bypassed. As a result, a demodulated audio signal of excellent S/N ratio is obtained with low distortion factor from the output terminal 67.

The constant values of the circuit elements of the circuit of the organization indicated in FIG. 7 are as follows:

RESISTORS

| | | | | | |
|---|---|---|---|---|---|
| $R_1$ | 56 KΩ | $R_{11}$ | 2.2MΩ | $R_{21}$ | 470 Ω |
| $R_2$ | 22 KΩ | $R_{12}$ | 1.5MΩ | $R_{22}$ | 470 Ω |
| $R_3$ | 100 KΩ | $R_{13}$ | 100 KΩ | $R_{23}$ | 33 KΩ |
| $R_4$ | 100 KΩ | $R_{14}$ | 8.2KΩ | $R_{24}$ | 330 Ω |
| $R_5$ | 56 KΩ | $R_{15}$ | 56 KΩ | $R_{25}$ | 56 KΩ |
| $R_6$ | 15 KΩ | $R_{16}$ | 100 KΩ | $R_{26}$ | 56 KΩ |
| $R_7$ | 470 Ω | $R_{17}$ | 100 KΩ | $R_{27}$ | 56 KΩ |
| $R_8$ | 470 Ω | $R_{18}$ | 56 KΩ | $R_{28}$ | 56 KΩ |
| $R_9$ | 33 KΩ | $R_{19}$ | 15 KΩ | $R_{29}$ | 10 KΩ |
| $R_{10}$ | 330 Ω | $R_{20}$ | 22 KΩ | $R_{30}$ | 10 KΩ |
| $R_{31}$ | 220 KΩ | $R_{34}$ | 330 KΩ | $R_{37}$ | 1.8KΩ |
| $R_{32}$ | 220 KΩ | $R_{35}$ | 330 KΩ | $R_{38}$ | 2.2KΩ |
| $R_{33}$ | 6.8KΩ | $R_{36}$ | 4.7KΩ | | |

VARIABLE RESISTORS

| | | | |
|---|---|---|---|
| $VR_1$ | 30 KΩ | $VR_2$ | 30 KΩ |

CAPACITORS

| | | | | | |
|---|---|---|---|---|---|
| $C_1$ | 0.022F | $C_8$ | 18 PF | $C_{15}$ | 0.22F |
| $C_2$ | 0.022F | $C_9$ | 18 PF | $C_{16}$ | 100 μF |
| $C_3$ | 330 PF | $C_{10}$ | 18 PF | $C_{17}$ | 0.011F |
| $C_4$ | 27 PF | $C_{11}$ | 18 PF | $C_{18}$ | 0.022F |
| $C_5$ | 0.022F | $C_{12}$ | 10 PF | $C_{19}$ | 0.022F |
| $C_6$ | 1 μF | $C_{13}$ | 10 PF | $C_{20}$ | 0.011F |
| $C_7$ | 0.022F | $C_{14}$ | 30 μF | | |

INDUCTORS

| | | | | | |
|---|---|---|---|---|---|
| $L_1$ | 100 mH | $L_2$ | 100 mH | $L_3$ | 100 mH |

It should be understood, of course, that the foregoing disclosure relates to only a preferred embodiment of this invention. It is intended to cover all modifications of the embodiment of the invention which do not constitute departures from the scope and spirit of the invention. For example, while the virtual multiplication factor is 4 in the above described embodiment, the multplication factor in the practice of this invention is not to be limited to 4.

What I claim is:

1. A system for demodulating an angularly modulated wave in which a carrier wave of relatively low frequency is modulated, comprising: waveshaping and phase-splitting means responsive to said modulated carrier wave for waveshaping and phase-splitting an angularly modulated wave, means responsive to said waveshaped and phase-split wave for producing two output square waves having mutually opposing phases; means for causing one of the output waveforms of said waveshaping and phase-splitting means to be delayed in phase by a specific angle and for producing a plurality of output square waves having equal phase delay angles with respect to the two output square waves of said waveshaping and phase-splitting means; means for differentiating each of said output square waves and for producing responsive thereto corresponding pulse trains having a frequency which is substantially multiplied relative to that of said angularly modulated wave; and means for pulse-count demodulating said pulse train signal.

2. A system for demodulating an angularly modulated wave in which a carrier wave of relatively low frequency is modulated, comprising: first waveshaping and phase-splitting means operated responsive to said modulated carrier wave for waveshaping and phase-splitting an angularly modulated wave, means responsive to said last mentioned means for producing two output square waves having mutually opposing phases; first and second differentiation means for respectively differentiating the output square waves having mutually opposing phases produced by said first waveshaping and phase-splitting means; delay means for causing one of the output square waves of said first waveshaping and phase-splitting means to be delayed in phase by 90°; second waveshaping and phase-splitting means for waveshaping and phase-splitting the resulting signal thus delayed in phase by 90° by said delay means and producing two output square waves having mutually opposing phases; third and fourth differentiation means for respectively differentiating the output square waves having mutually opposing phases of said second waveshaping and phase-splitting means; first, second, third, and fourth gate means corresponding respectively to said first, second, third, and fourth differentiation means, and means comprising said gate means for passing and mixing differentiated pulses from said differentiation means to produce a differentiated pulse train of a frequency which is substantially quadruple the frequency of said angularly modulated wave; and demodulation means supplied with said differentiated pulse train and carrying out pulse-count demodulation.

3. A system for demodulating an angularly modulated wave comprising: first waveshaping and phase-splitting means for producing two output square waves of mutually opposite phase responsive to a waveshaping of an angularly modulated wave in which a carrier wave of relatively low frequency is angularly modulated with a modulating signal; first differentiation means for differentiating one of the two output square waves and producing a first pulse train responsive thereto; second differentiation means for differentiating the other of the two output square waves and producing a second pulse train responsive thereto; delay means for delaying the phase of one of the two output square waves by 90°; second waveshaping and phase-splitting means for waveshaping the output wave of said delay means and producing two output square waves of mutually opposite phase reponsive thereto; third differentiation means for differentiating one of the two output square waves of said second waveshaping and phase-splitting means and producing a third pulse train responsive thereto; fourth differentiation means for differentiating the other of the two output square waves of said second waveshaping and phase-splitting means and producing a fourth pulse train responsive thereto; first, second, third and fourth gate means corresponding to the first, second, third and fourth differentiation means respectively for gating the pulse train of the corresponding differentiation means; pulse-count detector means responsive to the output waves of said first, second, third and fourth gate means for detecting said modulating signal; and means responsive to said detector means for producing a resultant pulse train of the output waves of said first, second, third and fourth gate means having a frequency which is substantially quadruple the frequency of the angular modulated wave.

4. A demodulation system as set forth in claim 3 in which said delay means comprises triangular waveform forming means for forming a triangular wave in accordance with one of the two output square waves of said first waveshaping and phase-splitting means, and means whereby said second waveshaping and phase-splitting means clips said triangular wave at the central part of the slope of said triangular wave and produces two output square waves respectively delayed in phase by 90° relative to the output square waves of said first waveshaping and phase-splitting means, said two output square waves having mutually opposing phases.

5. A demodulation system as set forth in claim 4 in which said triangular waveform forming means comprises a Miller integration circuit which produces a triangular wave in accordance with said one of the two output square waves of the first waveshaping and phase-splitting means.

6. A demodulation system as set forth in claim 3 in which said pulse-count detector means comprises a one-shot multivibrator responsive to the output waves of said first, second, third and fourth gate means for oscillating to produce a resultant pulse train of the output waves of said first, second, third and fourth gate means, and a low-pass filter means responsive to the resultant pulse train from said one-shot multivibrator for producing an output signal in accordance with the number of pulses in the resultant pulse train.

7. A demodulation system as set forth in claim 3 which the frequency of said carrier wave is approximately 30 KHz.

8. A demodulation system as set forth in claim 7 in which said angular modulated wave is an angular modulated wave with respect to the difference signal of two channel signals reproduced from a four-channel record disc.

* * * * *